(12) United States Patent
Ke

(10) Patent No.: US 8,253,813 B2
(45) Date of Patent: Aug. 28, 2012

(54) IMAGE CAPTURING DEVICE WITH SHAKE COMPENSATION

(75) Inventor: Chau-Yuan Ke, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 273 days.

(21) Appl. No.: 12/621,631

(22) Filed: Nov. 19, 2009

(65) Prior Publication Data

US 2010/0238306 A1 Sep. 23, 2010

(30) Foreign Application Priority Data

Mar. 21, 2009 (CN) .......................... 2009 1 0301002

(51) Int. Cl.
*H04N 5/228* (2006.01)
*H04N 5/225* (2006.01)
*G02B 7/02* (2006.01)
*G03B 17/00* (2006.01)
*G03B 3/10* (2006.01)

(52) U.S. Cl. .................. 348/208.5; 348/208.2; 348/373; 359/824; 396/55; 396/133

(58) Field of Classification Search ............ 348/208.99, 348/208.2, 208.5, 208.7, 208.8, 208.11, 360, 348/373–376; 359/557, 699–705, 811, 813–814, 359/819, 822, 824; 396/52–55, 133, 419, 396/421, 529

See application file for complete search history.

(56) References Cited

U.S. PATENT DOCUMENTS

| 4,643,522 | A | * | 2/1987 | Takashima | 359/824 |
| 5,680,251 | A | * | 10/1997 | Kato et al. | 359/557 |
| 6,307,678 | B2 | * | 10/2001 | Kosaka et al. | 359/557 |
| 6,397,008 | B2 | * | 5/2002 | Kuwana et al. | 396/55 |
| 7,466,910 | B2 | * | 12/2008 | Akada et al. | 396/55 |
| 7,663,824 | B2 | * | 2/2010 | Lee | 359/824 |
| 7,675,565 | B2 | * | 3/2010 | Cheng | 348/357 |
| 7,725,014 | B2 | * | 5/2010 | Lam et al. | 396/55 |
| 7,764,448 | B2 | * | 7/2010 | Chang | 359/824 |
| 7,961,234 | B2 | * | 6/2011 | Viinikanoja et al. | 348/264 |
| 7,965,932 | B2 | * | 6/2011 | Huang et al. | 396/55 |
| 7,983,551 | B2 | * | 7/2011 | Chang | 396/133 |
| 7,990,463 | B2 | * | 8/2011 | Ho et al. | 348/357 |
| 8,000,044 | B2 | * | 8/2011 | Ono et al. | 359/824 |
| 8,023,038 | B2 | * | 9/2011 | Chang | 348/345 |
| 8,049,971 | B2 | * | 11/2011 | Jung et al. | 359/694 |
| 8,072,517 | B2 | * | 12/2011 | Chang | 348/262 |
| 2001/0004420 | A1 | * | 6/2001 | Kuwana et al. | 396/55 |
| 2005/0270379 | A1 | * | 12/2005 | Seo | 348/208.5 |
| 2006/0257131 | A1 | * | 11/2006 | Yoon et al. | 396/133 |
| 2007/0046109 | A1 | * | 3/2007 | Ho et al. | 310/12 |
| 2008/0031605 | A1 | * | 2/2008 | Akada et al. | 396/55 |

(Continued)

*Primary Examiner* — Chieh M Fan
*Assistant Examiner* — Carramah J Quiett
(74) *Attorney, Agent, or Firm* — Altis Law Group, Inc.

(57) ABSTRACT

An image capturing device includes a housing, a camera module, a motion detector and a driving module. The housing defines a receiving cavity therein. The camera module is flexibly received in the receiving cavity. The motion detector is fixedly positioned on the camera module and is configured for detecting a rotational movement of the camera module. The driving module includes a first magnetic member and a second magnetic member. The first magnetic member is positioned on the camera module. The second magnetic member is positioned on the housing. The driving module is configured for driving the camera module to rotate through interaction of the first magnetic member and the second magnetic member to counteract the detected rotational movement of the camera module.

5 Claims, 5 Drawing Sheets

U.S. PATENT DOCUMENTS

| | | | | |
|---|---|---|---|---|
| 2008/0136923 A1* | 6/2008 | Inbar et al. | | 348/208.2 |
| 2008/0225129 A1* | 9/2008 | Viinikanoja et al. | | 348/218.1 |
| 2008/0304154 A1* | 12/2008 | Lee | | 359/557 |
| 2009/0059373 A1* | 3/2009 | Lam et al. | | 359/557 |
| 2009/0268314 A1* | 10/2009 | Shih | | 359/814 |
| 2010/0033822 A1* | 2/2010 | Chang | | 359/557 |
| 2010/0080545 A1* | 4/2010 | Fan et al. | | 396/55 |
| 2010/0110571 A1* | 5/2010 | Ono et al. | | 359/824 |
| 2010/0208089 A1* | 8/2010 | Chang | | 348/208.5 |
| 2010/0238569 A1* | 9/2010 | Chang | | 359/824 |
| 2010/0259822 A1* | 10/2010 | Huang et al. | | 359/557 |
| 2010/0265369 A1* | 10/2010 | Chang | | 348/262 |

* cited by examiner

IMAGE CAPTURING DEVICE WITH SHAKE COMPENSATION

BACKGROUND

1. Technical Field

The present disclosure relates to image stabilizing technologies, and particularly, to image capturing devices with a shake compensation.

2. Description of Related Art

An image capturing device typically includes an image sensor for converting light into electrical signals. The electrical signals can be processed to form images. If the image capturing device experiences vibration or movement during image capturing, the image sensor is likely to form blurred images.

Therefore, an image capturing device, which can overcome the above mentioned problems, is desired.

DETAILED DESCRIPTION

Figure 1:
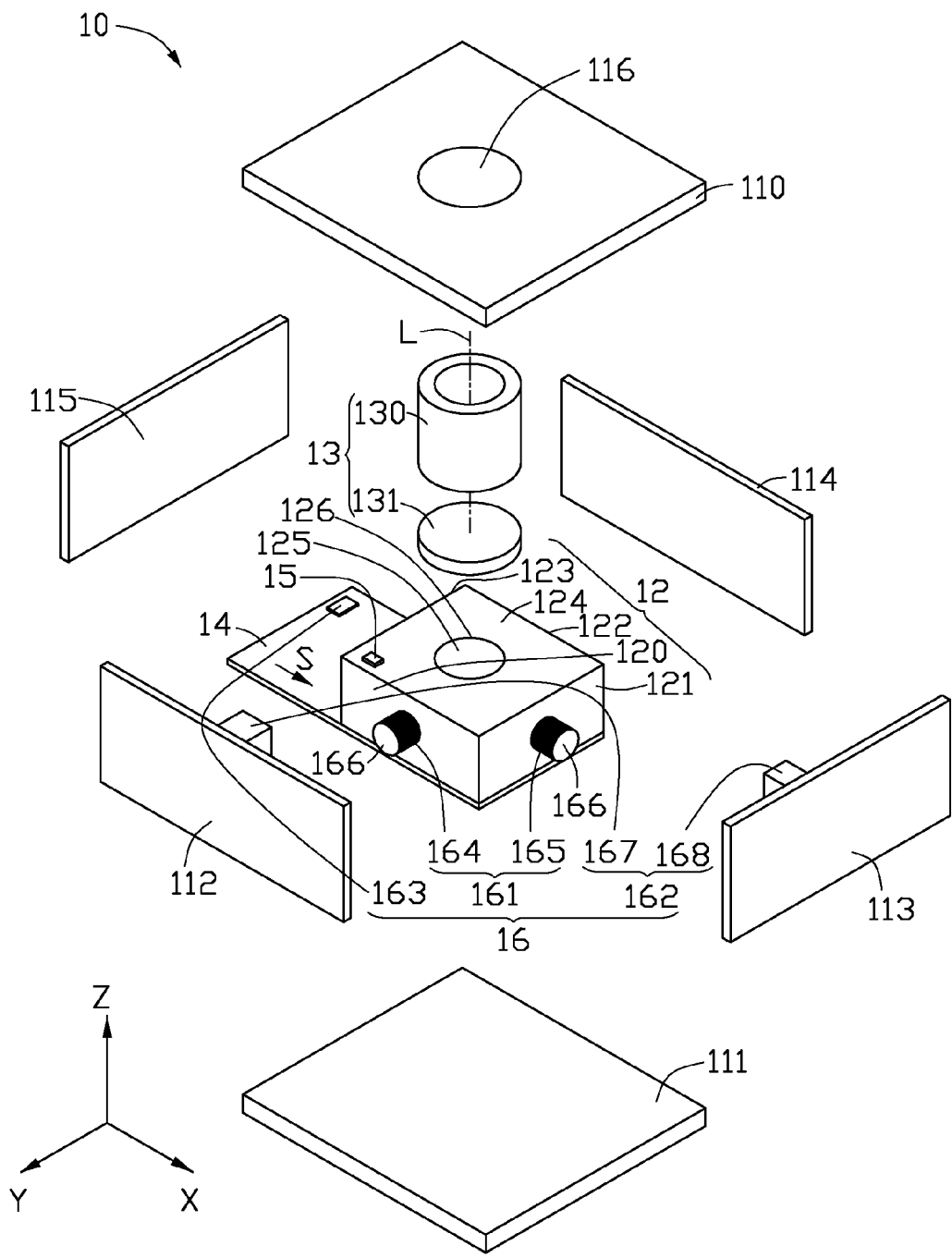
FIG. 1 is an exploded view of an image capturing device including a controlling unit, according to an exemplary embodiment.
Figure 3:
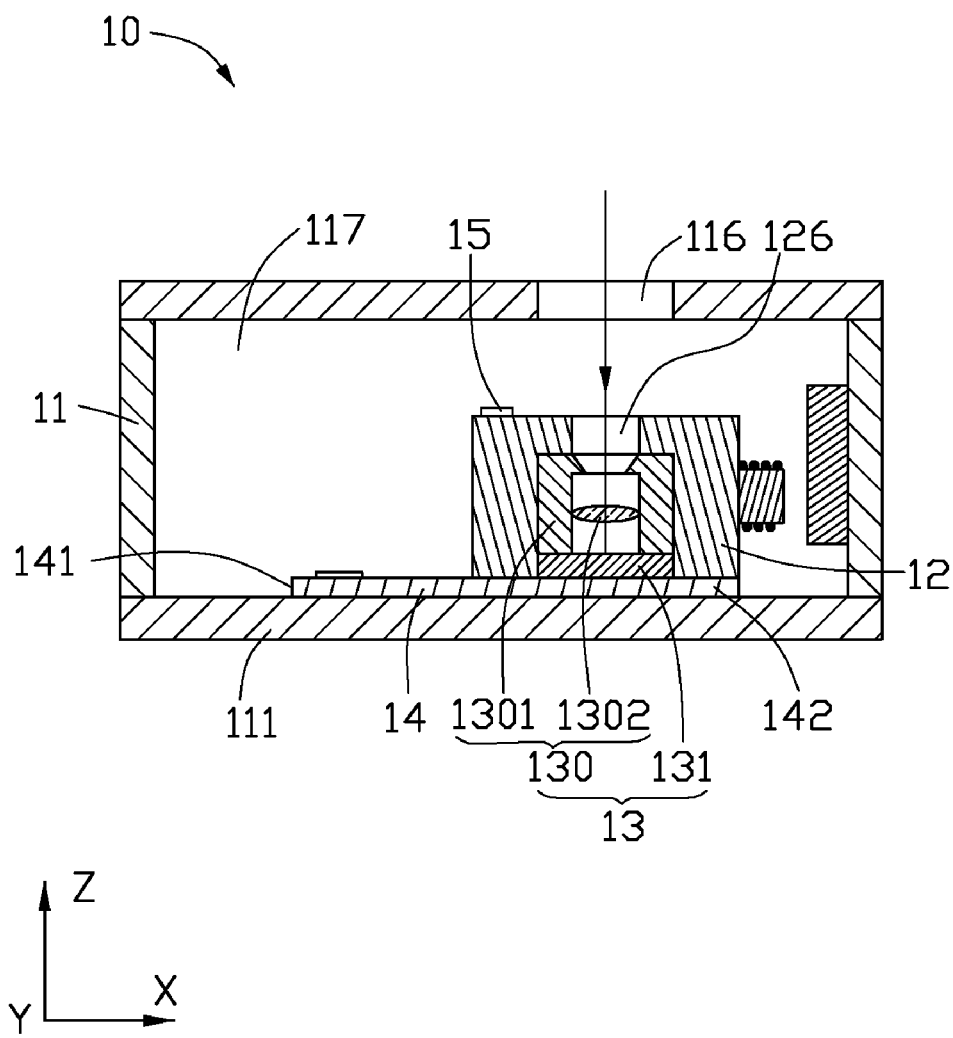
FIG. 3 is a sectional view of the image capturing device of FIG. 1, showing the image capturing device in a normal state.

Referring to FIGS. 1 and 3, an image capturing device 10, according to an exemplary embodiment, includes a housing 11, a sleeve barrel 12, a camera module 13, a flexible circuit board 14, a motion detector 15 and a driving module 16.

The housing 11 may be fixed to an electronic device, such as a digital camera (not shown) employing the image capturing device 10. The housing 11 is substantially cuboid-shaped and includes a upper cover 110, a lower cover 111, a first side plate 112, a second side plate 113, a third side plate 114 and a fourth side plate 115. The first side plate 112, the second side plate 113, the third side plate 114 and the fourth side plate 115 are connected end to end in that order. The upper cover 110 defines a first through hole 116. The upper cover 110 is substantially parallel to the lower cover 111 and both are connected substantially perpendicularly to the first side plate 112, the second side plate 113, the third side plate 114 and the fourth side plate 115. Therefore, a receiving cavity 117 is defined in the housing 11 accordingly. The receiving cavity 117 is in communication with the first through hole 116.

The sleeve barrel 12 is substantially cuboid-shaped and is received in the receiving cavity 117. The sleeve barrel 12 includes a first side wall 120, a second side wall 121, a third side wall 122, a fourth side wall 123 and an upper wall 124. The first side wall 120, the second side wall 121, the third side wall 122 and the fourth side wall 123 are connected substantially perpendicularly end to end in that order. The upper wall 124 is connected substantially perpendicularly to the first side wall 120, the second side wall 121, the third side wall 122 and the fourth side wall 123 to cooperatively define a receiving chamber 125. The first side wall 120 faces the first side plate 112. The second side wall 121 faces the second side plate 113. The third side wall 122 faces the third side plate 114. The fourth side wall 123 faces the fourth side plate 115. The upper wall 124 faces the upper cover 110. The upper wall 124 defines a second through hole 126. The second through hole 126 is in communication with the receiving chamber 125 and the receiving cavity 117 and is aligned with the first through hole 116. A diameter of the first through hole 116 is larger than that of the second through hole 126 such that when a shake compensation is carried out, light for forming images cannot be blocked by the upper cover 110.

The camera module 13 is fixedly received in the receiving chamber 125 and includes a lens module 130 and an image sensor 131. The camera module 13 moves together with the sleeve barrel 12. The lens module 130 includes a lens barrel 1301 and a lens 1302 received in the lens barrel 1301. An optical axis L of the lens module 130 is aligned with the image sensor 131 for a better imaging performance An optical axis of the lens 1302 coincides with the optical axis L of the lens module 130. The lens 1302 guides light to the image sensor 131. The image sensor 131 is configured for receiving light from the lens 1302 and converting such incident light into electrical signals. The image sensor 131 can be a charge-coupled device (CCD) type image sensor, or a semiconductor package selected from the group consisting of a ceramic leaded chip carrier (CLCC) package type image sensor, a plastic leaded chip carrier (PLCC) package type image sensor, and a chip scale package (CSP) type image sensor. In other alternative embodiments, the lens module 130 may further include an auto-focus mechanism and more than one lens.

The flexible circuit board 14 includes a fixed end 141 and a free end 142 opposite to the fixed end 141. The sleeve barrel 12 is fixedly positioned at the free end 142 of the flexible circuit board 14 with the upper wall 124 away from the flexible circuit board 14. The image sensor 131 is positioned on the free end 142 of the flexible circuit board 14 and electrically connected to the flexible circuit board 14. The electrical signals converted by the image sensor 131 can be transmitted outside through the flexible circuit board 14. The fixed end 141 protrudes from the sleeve barrel 12 and is fixed to the lower cover 111 of the housing 11. A coordinate system is defined as follow: Z axis is defined parallel to the optical axis L of the lens module 130. X axis is defined parallel to an extending direction S of the flexible circuit board 14 from the fixed end 141 to the free end 142 and is perpendicular to the Z axis. Y axis is defined perpendicular to the X axis and the Z axis.

The motion detector 15 is positioned on an outer surface of the upper wall 124 of the sleeve barrel 12 and is configured for detecting a rotational movement of the camera module 13. The motion detector 15 is an interferometric fiber optic gyroscope in this embodiment.

The driving module 16 is configured for moving the camera module 13 to counteract the detected rotational movement of the camera module 13 to carry out shake compensations. The driving module 16 includes a first magnetic member 161, a second magnetic member 162 and a controlling unit 163.

The first magnetic member 161 includes electromagnets positioned on the sleeve barrel 12 and the second magnetic member 162 includes permanent magnets positioned on the housing 11 in this embodiment. The first magnetic member 161 is electrically connected to the controlling unit 163 and includes a first coil 164 and a second coil 165. The first coil 164 and the second coil 165 are spiral coils. The first coil 164 and the second coil 165 each define a cylindrical cavity 166. The first coil 164 is fixed on an outer surface of the first side wall 120 with a central axis of the cylindrical cavity 166 substantially perpendicularly to the first side wall 120. The second coil 165 is fixed on an outer surface of the second side wall 121 with the central axis of the cylindrical cavity 166 substantially perpendicularly to the second side wall 121.

The second magnetic member 162 is made from a permanent-magnet material, such as neodymium iron boron alloy, samarium cobalt alloy, or alnico. The second magnetic member 162 includes a first permanent magnet 167 and a second permanent magnet 168. The first permanent magnet 167 and the second permanent magnet 168 are rectangular. The first permanent magnet 167 is fixed to the first side plate 112, facing the first coil 164. The first permanent magnet 167 and the first coil 164 interact to move the sleeve barrel 12 and the camera module 13 to rotate about the X axis. The second permanent magnet 168 is fixed to the second side plate 113, facing the second coil 165. The second permanent magnet 168 and the second coil 165 interact to move the sleeve barrel 12 and the camera module 13 to rotate about the Y axis. It is to be understood that in other alternative embodiments, the first magnetic member 161 may include permanent magnets instead of electromagnets, and the second magnetic member 162 may include electromagnets instead of permanent magnets.

The controlling unit 163 is configured for applying an electrical current to the first magnetic member 161 to move the camera module 13 to counteract the detected rotational movement of camera module 13 to carry out shake compensations. The controlling unit 163 is positioned on the flexible circuit board 14 and is electrically connected to the flexible circuit board 14. Electrical connections between the controlling unit 163 and the first magnetic member 161 can be implemented by the flexible circuit board 14.

Figure 2:
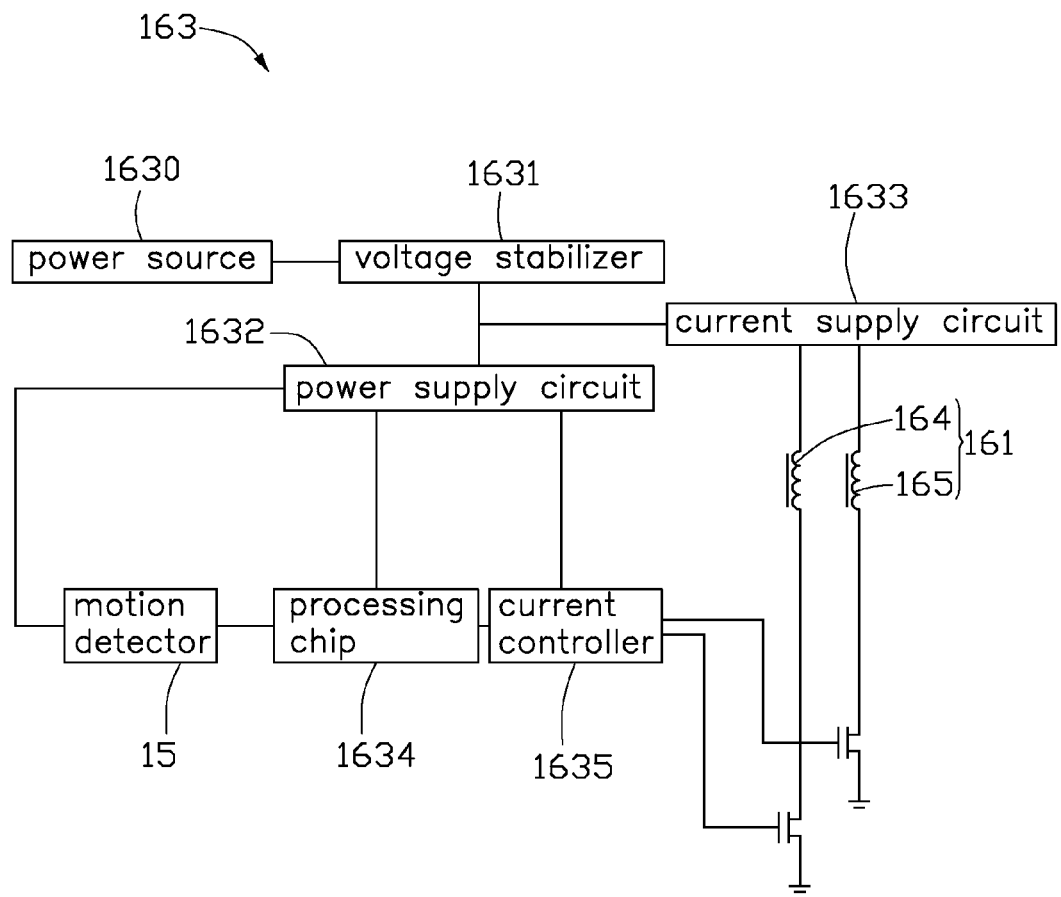
FIG. 2 is a circuit diagram of one embodiment of the controlling unit of FIG. 1.

Referring to FIG. 2, the controlling unit 163 includes a power source 1630, a voltage stabilizer 1631, a power supply circuit 1632, a current supply circuit 1633, a processing chip 1634 and a current controller 1635.

The power source 1630 is electrically connected to the voltage stabilizer 1631. The voltage stabilizer 1631 is configured for stabilizing an output voltage of the power source 1630.

The power supply circuit 1632 is electrically connected to the voltage stabilizer 1631 and is configured for supplying power to the motion detector 15, the processing chip 163 and the current controller 1635. The current supply circuit 1633 is configured for applying the electrical current to the first magnetic member 161. The processing chip 1634 is configured for determining amount and direction of the electrical current applied to the first magnetic member 161 to counteract the detected rotational movement of the camera module 13. The current controller 1635 is configured for controlling the current supply circuit 1633 to output the determined electrical current applied to the first magnetic member 161. When the determined electrical current is applied to the first magnetic member 161, the first coil 164 and/or the second coil 165 generate(s) a magnetic field accordingly. The magnetic field generated by the first magnetic member 161 and a magnetic field generated by the second magnetic member 162 interact to move the sleeve barrel 12 and the camera module 13 accordingly.

When in use, the image capturing device 10 works in a normal state, i.e., in an unshaken state, the flexible circuit board 14 is positioned on the lower cover 111 of the housing 11. Light propagates through the housing 11 and the sleeve barrel 12 and is focused by the lens module 130 to the image sensor 131, as illustrated in FIG. 3.

Figure 4:
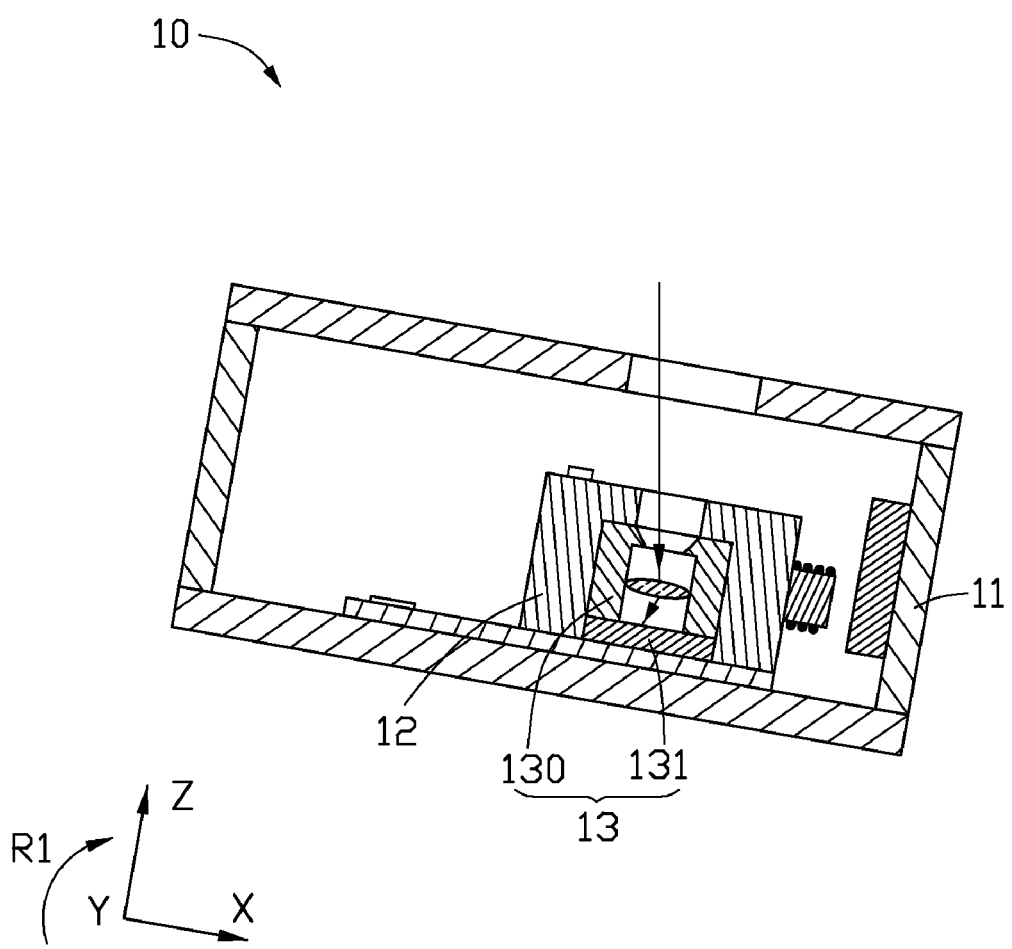
FIG. 4 is similar to FIG. 3, but showing the image capturing device in a shaken state.
Figure 5:
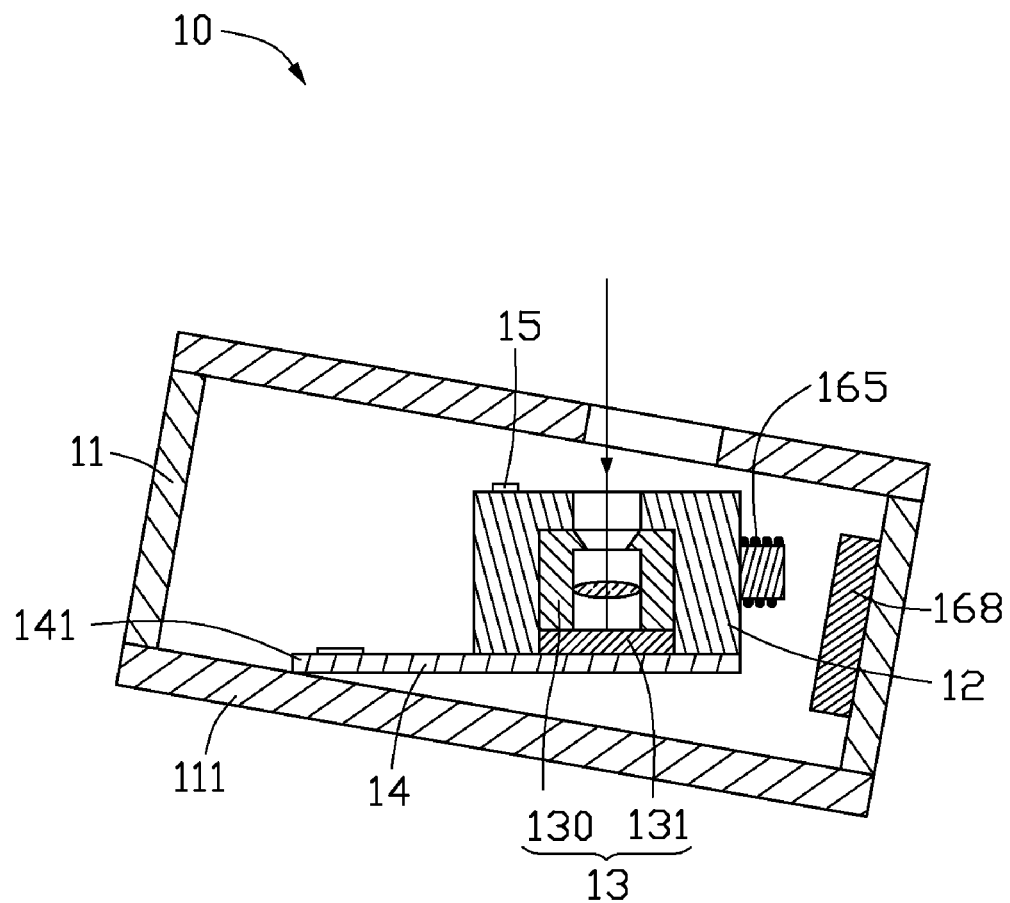
FIG. 5 is similar to FIG. 4, but showing the image capturing device in a shake compensation state.
Figure 5:
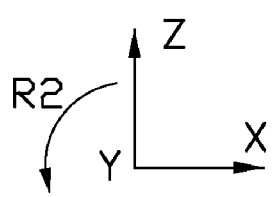

When the electronic device employing the image capturing device 10 is shaken, for example, to make the image capturing device 10 to rotate about the Y axis clockwise (a direction R1 shown in FIG. 4), the focused light may be incident onto the image sensor 131 with a different location, resulting a blurred image formed by the image sensor 131. The motion detector 15 detects a clockwise rotational movement of the sleeve barrel 12 and the camera module 13. The controlling unit 163 applies an electrical current to the second coil 165 of the first magnetic member 161. Therefore, the second coil 165 and the second permanent magnet 168 interact to rotate the camera module 13 about Y axis counterclockwise (a direction R2 shown in FIG. 5) to counteract the detected rotational movement of the camera module 13. As a result, the unwanted clockwise rotational movement of the camera module 13 is compensated by the interaction between the second coil 165 and the second permanent magnet 168. Thus, the blur of the image formed by the image sensor 131 can be eliminated or at least alleviated.

It is to be understood that if the camera module 13 rotates about the X and Y axes when the image capturing device 10 is shaken, the first coil 164 and the second coil 165 of the first magnetic member 161 are activated, e.g., electrified to interact with the first permanent magnet 167 and the second permanent magnetic 168 of the second magnetic member 162 correspondingly to compensate the unwanted rotational movement of the camera module 13.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An image capturing device, comprising:
   a housing defining a receiving cavity and having a first side plate and a second side plate connected to the first side plate;
   a camera module;
   a flexible circuit board having a fixed end fixed to the housing and a free end, wherein the camera module is attached to the free end;
   a motion detector fixedly positioned on the camera module and configured for detecting a rotational movement of the camera module, wherein the motion detector is an interferometric fiber optic gyroscope;
   a sleeve barrel received in the receiving cavity and comprising a first side wall, a second side wall, a third side wall, a fourth side wall, and an upper wall, wherein the first side wall, the second side wall, the third side wall, and the fourth side wall are connected substantially perpendicularly end to end in that order, the upper wall is connected to the first side wall, the second side wall, the third side wall and the fourth side wall to cooperatively define a receiving chamber, the camera module is received in the receiving chamber, the first side wall faces the first side plate, the second side wall faces the second side plate; and
   a driving module comprising a first magnetic member and a second magnetic member, and configured for driving the camera module to rotate through interaction of the first magnetic member and the second magnetic member to counteract the detected rotational movement of the camera module, wherein the first magnetic member comprises a first coil and a second coil, the first coil and the second coil each define a cylindrical cavity, the first coil is fixed on an outer surface of the first side wall with a central axis of the cylindrical cavity substantially perpendicularly to the first side wall, the second coil is fixed on an outer surface of the second side wall with the central axis of the cylindrical cavity substantially perpendicularly to the second side wall, the second magnetic member comprises a first permanent magnet and a second permanent magnet, the first permanent magnet is positioned on the first side plate corresponding to the first coil, the second permanent magnet is positioned on the second side plate corresponding to the second coil.

2. The image capturing device of claim 1, wherein the first coil and the second coil are spiral coils.

3. The image capturing device of claim 1, wherein the housing further comprises an upper cover, a lower cover, a third side plate, and a fourth side plate, the first side plate, the second side plate, the third side plate, and the fourth side plate are connected end to end in that order, the upper cover defines a first through hole, the upper cover is substantially parallel to the lower cover and both are connected to the first side plate, the second side plate, the third side plate, and the fourth side plate, a receiving cavity is defined in the housing, the receiving cavity is in communication with the first through hole, the sleeve barrel is received in the receiving cavity.

4. The image capturing device of claim 3, wherein the fixed end of the flexible circuit board is electrically connected to the camera module, and protrudes from the sleeve barrel to be fixed to the lower cover of the housing, the flexible circuit board is configured for transmitting electrical signals converted by the image sensor outside.

5. The image capturing device of claim 3, wherein the upper cover faces the upper wall, the upper wall defines a second through hole, the second through hole is in communication with the receiving chamber and the receiving cavity and is aligned with the first through hole, a diameter of the first through hole is larger than that of the second through hole such that when a shake compensation is carried out, light for forming images cannot be blocked by the upper cover.

* * * * *